Nov. 2, 1965  H. E. HALL, JR  3,215,837
DEVICE FOR CALIBRATING RADIOACTIVE WELL LOGGING APPARATUS
Filed June 15, 1959  2 Sheets-Sheet 1
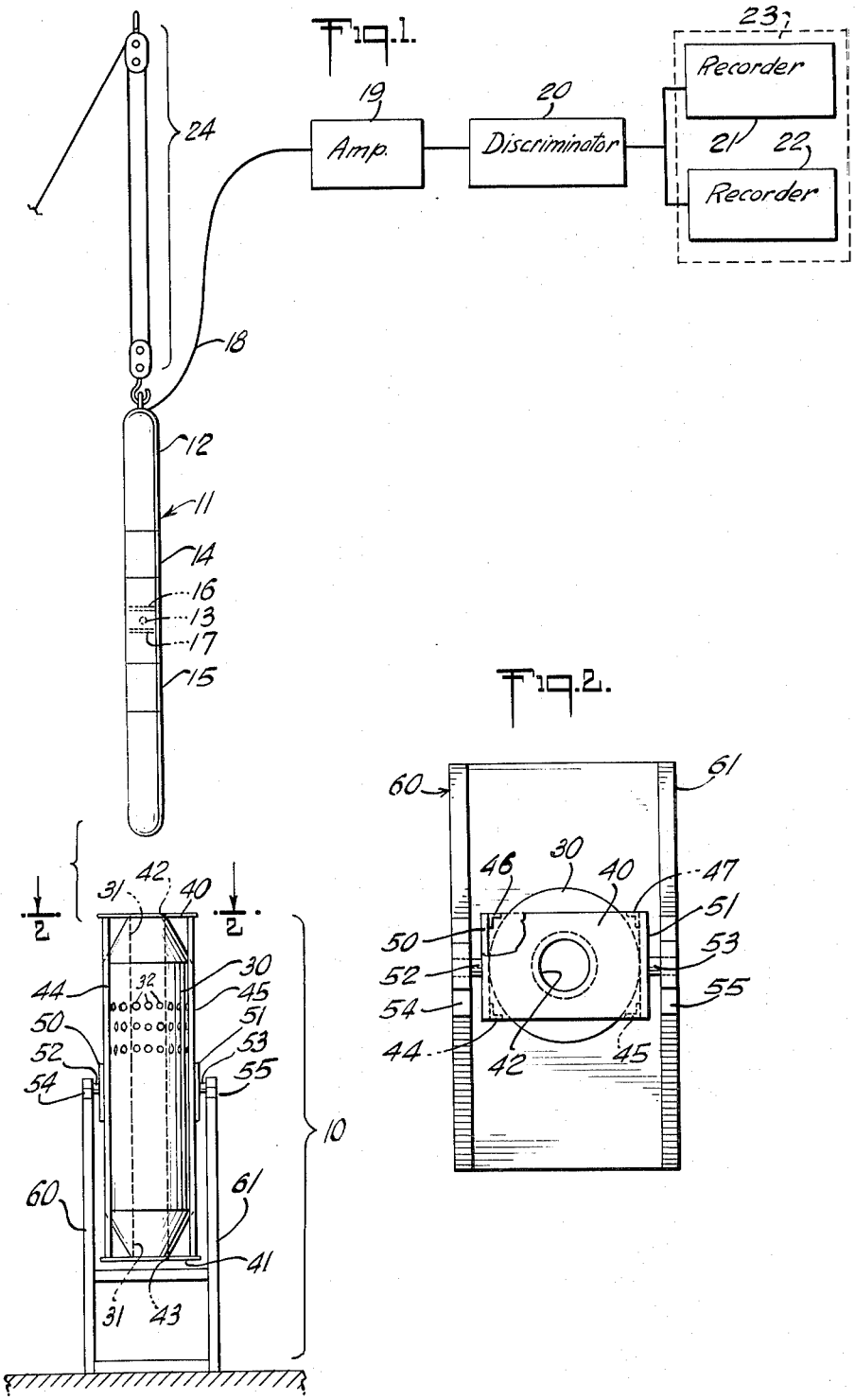

Nov. 2, 1965   H. E. HALL, JR   3,215,837
DEVICE FOR CALIBRATING RADIOACTIVE WELL LOGGING APPARATUS
Filed June 15, 1959   2 Sheets-Sheet 2
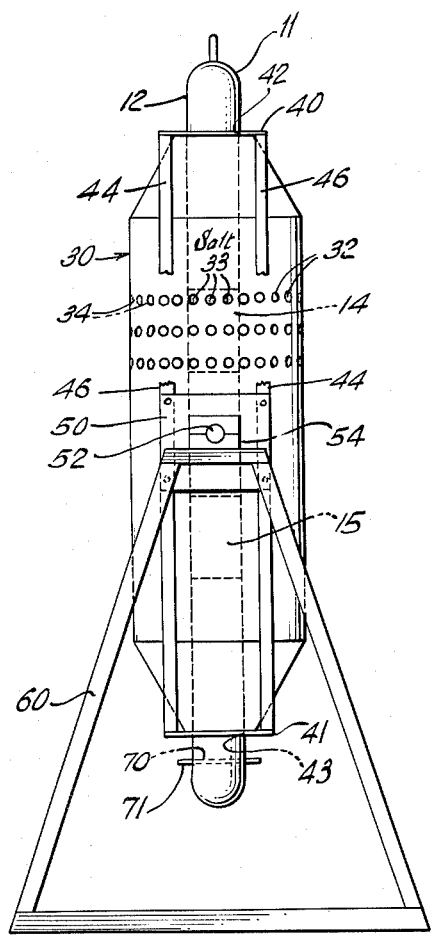
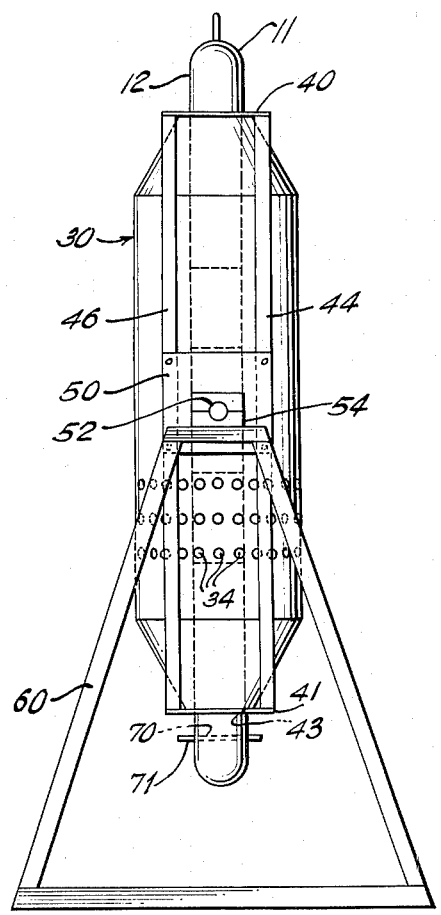

United States Patent Office 3,215,837
Patented Nov. 2, 1965

3,215,837
DEVICE FOR CALIBRATING RADIOACTIVE
WELL LOGGING APPARATUS
Hugh E. Hall, Jr., Houston, Tex., assignor to Texaco Inc.,
New York, N.Y., a corporation of Delaware
Filed June 15, 1959, Ser. No. 820,238
16 Claims. (Cl. 250—83)

The present invention relates generally to radioactivity well logging and, more particularly, it is concerned with improvements in method and apparatus for calibration of neutron well logging apparatus. Accordingly, it is a general object of the present invention to provide improvements in the calibration of radioactivity well logging apparatus.

The invention is especially directed to the calibration of apparatus for simultaneously indicating the hydrogen and salinity contents of an earth formation as an indication of the presence of oil or water. Thus, it is a more particular object of the present invention to provide apparatus particularly adapted for calibration of a well logging instrument comprising detection apparatus that is sensitive to the hydrogen content of an earth formation and that is also sensitive to the chlorine content thereof.

It is generally known in the art to calibrate radioactivity well logging instruments in order to assure accuracy of the logs conducted either subsequently or immediately prior thereto. For example, U.S. 2,666,142—Herzog, granted January 12, 1954, is concerned with such calibration. The present invention is directed primarily to calibration of well logging apparatus including an instrument having a source of neutrons for irradiating an earth formation along with means for detecting a first signal proportional to the hydrogen content of the earth formations and means for detecting a second signal proportional to the salinity content or salinity plus hydrogen content of the formations. Well logging apparatus for simultaneously determining the hydrogen and salinity content of a formation is disclosed, for example, in U.S. 2,752,504—McKay, issued June 26, 1956, and reissued on October 29, 1957, as Reissue No. 24,383. The invention is especially adapted to calibration of improved logging apparatus disclosed in the application of Hugh E. Hall, Jr., Serial No. 820,236, entitled "Radioactivity Well Logging" filed concurrently herewith. The logging instrument disclosed in the aforementioned application of Hugh E. Hall, Jr. comprises an elongated housing within which is provided a neutron source for irradiating the earth formations along the traverse of a bore hole and having a first radiation detector spaced from the source along the axis of the instrument at a predetermined distance and which is suited to detect induced gamma rays from the formation for providing a signal proportional to the hydrogen content of the formation and which is substantially insensitive to the salinity content of the formation. The instrument further includes a second radiation detection unit spaced from the neutron source along the axis of the instrument, ordinarily on the other side of the source from the first detector, and which is suited to detect gamma rays induced in the formation by the source and which provides a signal proportional to both the hydrogen content and the chlorine content of the formation. The two signals, namely, the hydrogen signal and the hydrogen-plus-chlorine signal are recorded in proper correlation to provide information for determining the presence of oil or salt water in the earth along the traverse of the bore hole. Accordingly, it is a still more particular object of the invention to provide improved well logging apparatus that is particularly suited to calibration of an elongated radiation logging instrument wherein a source of neutrons is provided for irradiating the formation and a first radiation signal is detected as an indication of the hydrogen content and a second radiation signal is detected as an indication of both the hydrogen and chlorine contents of the formation.

It is another object of the present invention to provide an improved apparatus for the calibration of a radioactivity well logging system, wherein the effect of ambient background radiation on the calibration procedure is minimized.

It is a more specific object of the invention to provide apparatus particularly suited to calibration of a logging instrument according to the foregoing objects wherein the radiation source is disposed in an elongated housing intermediate a first detector primarily sensitive to the hydrogen content and a second detector sensitive to both the chlorine and hydrogen content of the earth formation.

It is a still more specific object of the invention to provide portable apparatus to carry out the above objects and which is of relatively simple mechanical construction.

It is a still further object of the invention to provide improvements in methods of calibration particularly suited to the use of a portable calibration device for use at a well site.

Briefly stated, the present invention is concerned with the provision of a portable tubular member having an internal bore suited to receive therein a logging instrument for calibration and which is formed of hydrogenous material such as neoprene and which is suited to simulate a hydrogen containing earth formation. A predetermined quantity of chlorine containing material such as sodium chloride is imbedded in the hydrogenous material substantially uniformly around the tubular member at a location intermediate the center and one end thereof in order to simulate a salt water containing earth formation. The tubular structure is mounted at its mid-point to a portable supporting structure by means of trunnion bearings in such manner as to provide for inversion of the member by rotation about the axis of the trunnion bearings in order that a logging instrument may be lowered into either end thereof.

The method of calibration contemplated by the present invention involves transporting the calibrating apparatus to the site of the well to be logged, positioning the tubular member in a generally vertical position, lowering at least that portion of the instrument including the radiation source and detector to be calibrated within the tubular member so that the detector is opposite a selected portion of the member, conducting a calibration run of the thus disposed instrument by noting and adjusting the instrument response while in the environment of the calibrator, withdrawing the instrument from the calibrator device, rotating the tubular member through approximately 180° and re-inserting the instrument so that the source is again within the member and the detector under calibration is now opposite a different portion of the member, conducting another calibration of the instrument to determine the response of the instrument with the detector in the environment of the new portion of the member. One of the two calibration runs should be conducted with the detector in the vicinity of the hydrogenous material of the member only and with the other run being conducted while the detector is under the influence of the chlorine impregnated portion of the member. The response of the logging apparatus should be adjusted to give a desired difference between these two positions for calibration of a chlorine sensitive instrument and in the case of an instrument which is designed to provide a response that is substantially insensitive to the presence of chlorine, adjustments should be made, as necessary, so that the instrument response is substantially identical whether chlorine is present or not.

Preferably, after inserting the logging instrument into the bore of the calibration device, both the instrument and device should be raised above the well site to isolate them from ambient ground level radiation at the well site during the calibration runs.

It is further contemplated, in the case of a combined logging instrument containing a first detector which is sensitive to chlorine and a second detector which is relatively insensitive to chlorine, that the two portions of the logging instrument may be calibrated during the same calibration run. In the case of a logging instrument having a radiation source disposed between the chlorine sensitive detector in one direction and the chlorine insensitive detector in the opposite direction, the instrument should be inserted within the member so that the radiation source is generally centralized, i.e. in the vicinity of the trunnion bearings, and so that the chlorine is in the vicinity of one of the detectors while the other detector is maintained in a substantially chlorine-free environment. By conducting the second calibration run with the member inverted, the position of the two detectors can then be transposed in order to provide an opportunity to calibrate both detectors in the chlorine environment and both detectors in the chlorine-free environment.

For additional objects and advantages and for a better understanding of the invention attention is now directed to the following description and accompanying drawings. The features of the invention which are believed to be novel are particularly pointed out in the appended claims.

In the drawings:

FIG. 1 is a schematic representation, partly in cross section, of a vertical elevation showing calibration apparatus according to the invention positioned at a well site and which also shows a combination well logging instrument and associate instrumentation suited for calibration according to the teachings of the invention;

FIG. 2 is a plan view of calibration apparatus according to the invention, taken through the lines 2—2 of FIG. 1.

FIG. 3 is a vertical elevation, partly in cross section, showing calibration apparatus according to the invention having a combination logging instrument mounted therein for calibration; and FIG. 4 is a vertical elevation similar to FIG. 2 but showing the calibration apparatus in its inverted position as compared with the view shown in FIG. 2.

Referring now to FIG. 1 of the drawings there is shown portable calibration apparatus 10 constructed according to the invention and which is suitable for calibrating a radioactivity well logging system such as that shown comprising an elongated instrument 11 adapted to be passed through a bore hole, together with the associated signal handling and recording equipment. In particular, the illustrated logging instrument 11 comprises an elongated sealed housing 12 formed of steel or the like to withstand the conditions of temperature and pressure found in the bore hole. Within the housing 12 there is provided a neutron source 13 which may comprise, for example, a radium-beryllium source, polonium-beryllium, plutonium-beryllium, or other relatively gamma-free neutron source or a so-called neutron generator, such as an apparatus for accelerating charged particles such as deuterons against a deuterium or tritium target. Within the housing 12, above the source 13 and spaced therefrom along the axis of the instrument housing 11, there is provided a first detector 14 sensitive to radiation which may result from irradiation of an earth formation by neutrons from the source 13 and which is adapted and arranged to provide a signal that is proportional to the hydrogen content of the earth formation. The detection apparatus may comprise a detector of neutron induced gamma rays which is made preferentially sensitive to the effect of hydrogen and relatively insensitive to the effect of chlorine which may be present in the formation along with hydrogen found in oil or water. Also spaced from the neutron source 13 at a predetermined distance and preferably on the opposite side of the source 13 from the first detector 14, as shown, there is provided a second detector 15 of radiation emitted from the formation due to the source and which, together with associated apparatus, is adapted and arranged to provide a signal that is proportional to the chlorine content of the earth formation. Advantageously this detector 15 may be sensitive to both the chlorine and hydrogen contents of the formation in order to provide a signal for correlation with the signal derived from the first detector 14 and whereby the difference between the signals from the respective detectors 14, 15 provides an indication of the chlorine content, with corresponding variations of the two signals being indicative of the hydrogen content of the formation. Such apparatus is shown in detail in the aforesaid application Serial No. 820,236 of Hugh E. Hall, Jr. filed concurrently herewith. Intermediate the source 13 and each of the respective detectors 14, 15 there is provided appropriate shieldings 16, 17, such as lead or tungsten, for preventing any gammas which may be emitted from the source 13 concurrently with the neutrons from adversely affecting the desired signal of the detectors 14, 15. Although not specifically illustrated, it is to be understood that the instrument 11 also includes such electrical equipment as may be required for operation of the detectors and transmission of the output signals to the surface equipment, as by means of the cable 18 which is also suitable for suspending the instrument 11 in a bore hole in known manner. The surface equipment includes the necessary means for receiving the signals transmitted over the cable 18 from the instrument 11, and for amplifying, separating and recording the two signals, such as the amplifier 19, discriminator 20 and recorders 21, 22 for each of the two channels, one recorder 21 being for the detector 14 primarily sensitive to hydrogen and the other recorder 22 being for the detector 15 which is sensitive to chlorine (either with hydrogen or independently thereof as the case may be). It is to be understood that various components of the system for transmitting the logging signal to the surface for recording may be located either in the instrument or at the surface; in accordance with principles of signal transmission known in the art. It is also to be understood that logging system includes rate-meter apparatus for providing a record of the intensity, i.e., rate-of-occurrence of detected radiation. As indicated by the dashed box 23 enclosing both recorders 21, 22 it is to be understood that they may comprise separate channels on the same multi-channel recorder. It is also to be understood that, in certain instances, the two signals may actually be electrically combined either in the logging instrument 11 or surface equipment if desired to provide a record or other display showing the difference between the two signals. Means comprising a block-and-tackle arrangement 24 are shown attached to the top of the instrument 11 for raising and lowering the instrument at a well site for calibration.

The calibration apparatus 10 is shown in position as at a well site, ready for insertion therein of the logging instrument 11 which is suspended above it by means of the block-and-tackle arrangement 24. The calibration apparatus comprises an elongated tubular member 30 of generally circular cross section having a bore 31 of sufficient size to accept the logging instrument 11 which, for example, may have an outside diameter of 4″ in which case the bore 31 of the calibrator 30 may conveniently be 4⅜″ in diameter. The calibration member 30 is formed of hydrogenous material preferably in the nature of synthetic rubber such as neoprene which provides the desired calibration environment and which also provides structural ruggedness suited to repeated use under conditions met in an oil field. The member 30 should be of sufficient length to permit the radiation source and detector of the instrument being calibrated to be substantially enclosed thereby during calibration in order to provide an environment for the instrument which simulates that found in a bore hole. In the case of a combination logging instrument, as shown, the calibration member should preferably be sufficiently long to enclose the source and both detectors at the same time, in order to facilitate calibration as discussed below. The walls of the member should be sufficiently thick to provide the desired quantity of hydrogenous material for thermalizing and capturing neutrons in a manner similar to that of a bore hole whose pores contain an appreciable quantity of oil or water. A wall thickness of about 3" has been found quite satisfactory. The elongated calibration member may be tapered at its ends as shown in the drawings in order to reduce its size and weight.

The tubular member should have a substantially uniform wall thickness throughout its length, and especially should the wall thickness be substantially the same in the two regions wherein the detector or detectors are placed for calibration in order to assure substantially equal attenuation of ambient background radiation passing toward the detector within the calibration member. This avoids the necessity of accounting for variations in ambient radioactivity when the detector is positioned at a different location within the tubular member.

At a location intermediate the center, i.e., at the trunnion bearing axes, of the calibration member 30 and one end thereof there are provided a plurality of cavities 32 each of which contains a predetermined quantity of material 33 for simulating a salt water-containing formation. In particular, the cavities 32 may advantageously be provided by drilling a plurality of uniformly spaced holes part-way into the member 30 around its periphery. In a preferred embodiment three rows are provided with each row containing 33 holes 1" apart with each hole being ½" in diameter and 2¾" deep. Each of the holes 32 is filled with 7 cc. of table salt 33 and plugged with rubber stoppers 34 in order to provide a simulated salt-containing formation of desired characteristics. This structure provides a uniform simulated salt water environment which may be modified or adjusted merely by removing one or more of the rubber stoppers 34 in order to remove or substitute a different quantity of material for that initially employed.

The tubular member 30 is mounted in a supporting framework or cradle comprising first and second endplate members 40, 41, shown in FIG. 2 as of substantially rectangular shape, and which lie flat against the respective ends of the calibration member 30 and which are provided with appropriate holes 42, 43 which are aligned with the bore 31 of the member 30 for receiving an instrument for calibration. Four rod-like members, 44, 45, 46, 47 (only the front two rods 44, 45 being visible in FIG. 1), each being substantially the same length as the calibration member 30, are positioned along the outer surface of the calibration member 30 with the ends of the respective ones thereof being bolted to the four corners of the end plates 40, 41 so that they form, together with the end-plates 40, 41, a supporting cradle for the tubular member 30.

A first side bearing plate 50 is attached, as by means of bolts, to the adjacent supporting rods 44, 46 (46 not shown in FIG. 1) on the left side of the calibration member 30, as shown in FIG. 1, and a second side bearing plate 51 is attached to the two adjacent supporting rods 45, 47 (47 not shown in FIG. 1) on the right side of the calibration member as shown in FIG. 1. The two side bearing plates 50, 51 are located substantially opposite one another at the center of the member 30 in order to provide support for left and right trunnions 52, 53 for mounting the member 30 for rotation about an axis transverse to its bore 31 by means of trunnion bearings 54, 55 attached to a supporting base. The supporting base comprises first and second supporting frames 60, 61 having the trunnion bearings 54, 55, shown in the form of pillow blocks, mounted thereto for supporting the trunnions 52, 53 which are attached to the cradle which supports the elongated member 30. Each supporting frame 60, 61 comprises front and rear supporting legs joined together at their upper and lower ends respectively by upper and lower cross members. The respective trunnion bearings 54, 55 are mounted, as by means of bolts, to the top of the respective upper cross members of each of the supporting frames 60, 61. As shown in FIGS. 3 and 4 the two supporting frames are wider at their respective bases than at their upper ends in order to reduce the likelihood of tipping. The corresponding front legs and corresponding rear legs of the two supporting frames 60, 61 are joined at the base by appropriate lower front and rear cross members respectively and by means of additional upper front and rear cross members positioned a short distance thereabove in order to assure rigidity to the base. The position of the upper front and rear cross members is limited by the length of the calibration member 30 as compared with the height of the supporting base inasmuch as the upper cross members cannot interfere with rotation of the elongated member about the axis of the trunnion bearings.

The metal members of the supporting structure may advantageously be formed of material having a relatively low thermal neutron capture cross-section in order to provide the necessary support without introducing adverse effects upon the response of the instrument being calibrated. Preferably therefore the supporting framework should be formed of aluminum rods or angle members and may advantageously be formed of ¼" x 1" angle aluminum. The end plates should likewise be formed of ¼" aluminum material. Brass machine screws may be employed for assembling this structure. The use of aluminum is also advantageous in minimizing the weight of the portable calibrator.

In order to calibrate a logging instrument with the apparatus of the present invention, as mentioned above, the logging instrument and calibrator should advantageously be raised above the well site in order to isolate the instrument and calibrator from ambient radioactivity which might interfere with the calibration. In order to facilitate raising the instrument and housing, means are provided whereby the calibrator may be engaged by the logging instrument so that the calibrator will be raised together with the logging instrument when the instrument is lifted as by means of the block-and-tackle arrangement shown in FIG. 1. To achieve this purpose, the housing 12 of the logging instrument 11 may be provided with a transverse hole 70 for insertion therein of a rod 71 which is of sufficient length to pass completely through the logging instrument with both ends protruding therefrom so that protruding ends may abut against one or the other of the end-plates 40, 41 of the calibrator and thus cause the calibrator to be lifted with the logging instrument. It has been found satisfactory to hoist the entire assembly comprising the calibrator and logging instrument inserted therein a distance of about nine (9) feet above the well site for carrying out the calibration procedure, as discussed hereinabove.

A particular advantage afforded by the present invention is the minimization of the effect of ambient background radiation on the calibration procedure. This advantage is due to the fact that the tubular calibration member affords substantially the same attenuation for the ambient radiation travelling toward the detector within the calibration member, regardless of whether the detector is positioned at one end or the other.

Obviously many modifications and variations of the invention, as hereinbefore set forth, may be made without departing from the spirit and scope thereof, and therefore only such limitations should be imposed as are indicated in the appended claims.

I claim:

1. Apparatus for calibration of an elongated well logging instrument comprising a portable tubular calibration member having an internal bore suitable to receive therein a logging instrument for calibration, said tubular member being formed of hydrogenous material which is suited to simulate an earth formation having a predetermined hydrogen content, a predetermined quantity of chlorine-containing material imbedded in the hydrogenous material around the tubular member at a location intermediate the center of the member and one end thereof, said tubular member being mounted for rotation about an axis substantially transverse to said bore so that a logging instrument may be lowered into the bore of the member from either end thereof.

2. Apparatus according to claim 1 wherein the tubular calibration member has a substantially uniform wall thickness throughout its length whereby it affords substantially equal attenuation for ambient radiation passing toward a detector within the bore of the tubular member regardless of the position of the detector along the bore of the tubular member.

3. Apparatus according to claim 1 wherein the tubular member is mounted to a supporting framework by means of trunnion bearings.

4. Apparatus according to claim 1 wherein the tubular calibration member is formed of neoprene.

5. Apparatus according to claim 4 wherein the calibration member is mounted in a supporting cradle and wherein the supporting cradle is mounted to a supporting framework by means of trunnion bearings.

6. Apparatus according to claim 1 wherein the chlorine containing material is provided in a plurality of salt-containing cavities in the form of substantially uniformly spaced holes around the member and which are provided with removable stoppers to provide for adjustment of the chlorine content of the member.

7. Apparatus according to claim 3 wherein the supporting framework is formed essentially of aluminum.

8. The method of calibrating a generally tubular elongated radioactivity well logging instrument through the use of a portable tubular calibrator member having an internal bore accessible and suitable to receive therein at either end the logging instrument for calibration at a well site which comprises positioning the tubular member in a generally vertical position, lowering at least that portion of the logging instrument including the radiation source and detector to be calibrated into one end of said bore of the tubular member so that the detector is within said member in the vicinity of a selected portion of the member, conducting a calibration run of the thus disposed instrument by noting and adjusting the instrument response while in the invironment of the calibrator, withdrawing the instrument from the calibrator device, rotating the tubular member through approximately 180° in order to reverse the position of the respective ends thereof, reinserting the logging instrument into the other end of the bore of the tubular member so that the source and detector are again within the member with the detector under calibration in a different selected portion of the member, conducting another calibration of the instrument to determine the response of the instrument with the detector in the environment of the new portion of the member, and withdrawing the logging instrument for use in conducting a well log thereafter.

9. The method of claim 8 further comprising the steps of attaching the calibration device to the logging instrument and raising the instrument with the attached calibration device above the well site to isolate the instrument from ambient ground level radiation during each calibration run.

10. Apparatus for calibration of an elongated well logging instrument comprising a portable tubular calibration member having an internal bore suitable to receive therein a logging instrument for calibration, said tubular member being formed of hydrogenous material which is suited to simulate an earth formation having a predetermined hydrogen content, a predetermined quantity of material having a predetermined neutron-interaction characteristic imbedded in the hydrogenous material around the tubular member at a location intermediate the center of the member and one end thereof, said tubular member being mounted for rotation about an axis substantially transverse to said bore so that a logging instrument may be lowered into the bore of the member from either end thereof.

11. Apparatus according to claim 10 wherein the tubular calibration member has a substantially uniform wall thickness throughout its length whereby it affords substantially equal attenuation for ambient radiation passing toward a detector within the bore of the tubular member regardless of the position of the detector along the bore of the tubular member.

12. Apparatus according to claim 10 wherein the tubular calibration member is formed of neoprene.

13. Apparatus according to claim 10 wherein the neutron-interaction material is provided in a plurality of cavities in the form of substantially uniformly spaced holes around the member and which are provided with removable stoppers to provide for adjustment of the neutron-interaction content of the member.

14. Apparatus for calibration of an elongated well logging instrument suitable for irradiating an earth formation surrounding a bore hole with penetrative radiation and detecting resultant radiation in the bore hole as an indication of a characteristic of an irradiated formation comprising a portable tubular calibration member having an internal bore therethrough suitable to receive therein a logging instrument for calibration, said tubular member being formed of a given material which is suited to simulate an earth formation having a predetermined response to a given penetrative radiation, said tubular member being mounted for rotation about an axis substantially transverse to said bore so that a logging instrument may be lowered into the bore of the member from either end thereof, and a predetermined quantity of another material having a predetermined significantly different characteristic response to the given penetrative radiation included in the tubular member at a location intermediate said axis of rotation of the member and one end thereof.

15. Apparatus as defined in claim 14 further characterized in that it is suitable for calibration of a well logging instrument including a source of penetrative neutron radiation, wherein the tubular calibration member is formed of hydrogenous material suited to simulate an earth formation having a predetermined hydrogen content and wherein the other material included at the location intermediate the axis of rotation and one end of the member has a significantly different neutron-interaction characteristic than said hydrogenous material.

16. Apparatus as defined in claim 14 wherein said given material of which said tubular member is formed comprises substantially hydrogenous material and wherein said predetermined quantity of another material included in the tubular member at said location intermediate said axis of rotation of the member and said one end thereof comprises a predetermined quantity of chlorine.

References Cited by the Examiner
UNITED STATES PATENTS

| 2,666,142 | 6/54 | Herzog et al. | 250—83 |
| 2,816,235 | 12/57 | Scherbatskoy | 250—83 |
| 2,945,129 | 7/60 | Swift et al. | 250—83 |
| 2,978,585 | 4/61 | Rabson | 250—83 |

RALPH G. NILSON, *Primary Examiner.*

ARTHUR GAUSS, *Examiner.*